United States Patent
Takeuchi et al.

(10) Patent No.: US 7,889,639 B2
(45) Date of Patent: Feb. 15, 2011

(54) FIBER CHANNEL SWITCH AND COMPUTER SYSTEM USING THE SAME

(75) Inventors: Jun Takeuchi, Kawasaki (JP);
Toshitaka Yanagisawa, Kawasaki (JP);
Tetsuya Kinoshita, Kawasaki (JP);
Takashi Murayama, Kawasaki (JP);
Toshiaki Takeuchi, Kawasaki (JP);
Atsushi Shinohara, Kawasaki (JP);
Yusuke Kurasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 803 days.

(21) Appl. No.: 11/277,277

(22) Filed: Mar. 23, 2006

(65) Prior Publication Data
US 2007/0171815 A1 Jul. 26, 2007

(30) Foreign Application Priority Data
Dec. 20, 2005 (JP) .............................. 2005-366981

(51) Int. Cl.
*G01R 31/08* (2006.01)
*G06F 15/16* (2006.01)
(52) U.S. Cl. ...................................... 370/220; 709/218
(58) Field of Classification Search ................. 370/216, 370/217, 220, 351, 357, 386, 412–418; 709/238, 709/201, 203, 217–219, 213, 216; 711/100, 711/154, 161, 162, 200, 202, 101, 111, 112, 711/114; 710/1, 36
See application file for complete search history.

(56) References Cited

U.S. PATENT DOCUMENTS

| | | | |
|---|---|---|---|
| 6,651,154 B1 * | 11/2003 | Burton et al. | 711/202 |
| 7,447,198 B1 * | 11/2008 | Banks et al. | 370/386 |
| 2003/0149812 A1 * | 8/2003 | Schoenthal et al. | 710/36 |
| 2006/0015684 A1 * | 1/2006 | Schnapp et al. | 711/114 |
| 2006/0143305 A1 * | 6/2006 | Mason et al. | 709/238 |
| 2007/0094466 A1 * | 4/2007 | Sharma et al. | 711/162 |

(Continued)

FOREIGN PATENT DOCUMENTS

JP 2002-526821 8/2002

(Continued)

OTHER PUBLICATIONS

Machine translation for JP 2003-330906.*

(Continued)

*Primary Examiner*—Ricky Ngo
*Assistant Examiner*—Paul Masur
(74) *Attorney, Agent, or Firm*—Staas & Halsey LLP

(57) ABSTRACT

The fiber channel switch is capable of protecting data even if communication for adjusting reserves of access rights, which is performed by communication means, is interrupted. The fiber channel switch comprises: a plurality of connection terminals connected to a host computer and a physical storage unit via fiber channels; a storage virtualization unit producing a virtual storage unit; a first communication unit for communicating with another fiber channel switch; an access adjusting unit for adjusting an access reserve between the fiber channel switches; a unit for setting a master-slave relation between the fiber channel switches; a block control unit for blocking access between the host computer and the physical storage unit via the fiber channel switch if the fiber channel switch is set as a slave when the communication between the fiber channel switches is interrupted.

9 Claims, 4 Drawing Sheets

U.S. PATENT DOCUMENTS

2007/0112931 A1* 5/2007 Kuik et al. .................. 709/216

FOREIGN PATENT DOCUMENTS

| JP | 2003-44421 | 2/2003 |
|---|---|---|
| JP | 2003-330906 | 11/2003 |
| JP | 2004-21556 | 1/2004 |
| JP | 2005-301638 | 10/2005 |
| JP | 2005-310046 | 11/2005 |

OTHER PUBLICATIONS

Machine translation for JP 2005-310046.*
Machine translation for JP 2005-301638.*
Japanese Office Action mailed Nov. 10, 2009 and issued in corresponding Japanese Patent Application No. 2005-366981 (4 pages English Translated).

* cited by examiner

FIBER CHANNEL SWITCH AND COMPUTER SYSTEM USING THE SAME

BACKGROUND OF THE INVENTION

The present invention relates to a fiber channel switch, which comprises a plurality of connection terminals respectively connected to a host computer and at least one physical storage unit via fiber channels and storage virtualization means for producing a virtual storage unit with a part or a whole of a storage area of the physical storage unit and making the host computer recognize the virtual storage unit, and a computer system using the fiber channel switch.

In the conventional computer system including a plurality of physical storage units, storage areas of the physical storage units are combined so as to make a host computer recognize as a virtual storage unit.

An example of such computer system employing the virtual storage unit is disclosed in Japanese Patent Gazette No. 2003-44421. The computer system is shown in FIG. 3. A plurality of host computers (node units) 1 and a plurality of storage units 2 are connected by a fiber channel switch (network switch) 3. A network processor 31 of the fiber channel switch 3 combines a part or a whole of a storage area of each storage unit 2 so as to constitute a virtual storage unit (virtual common disk) 5. The host computers 1 are capable of accessing to the virtual storage unit 5.

By the virtualization of the storage with the fiber channel switch, a user can optionally produce the virtual storage unit on the basis of uses of the host computer. By accessing to the virtual storage unit, the host computer can use the physical storage units without regard to storage capacities and connection types of the physical storage units.

Further, reliability of the storage virtualization can be improved by using a plurality of fiber channel switches. This structure is called multinode.

A conventional multinode computer system including a plurality of the fiber channel switches is shown in FIG. 4.

In FIG. 4, host computers 11a and 11b and a RAID storage unit 14, which includes physical storage units X and Y, are respectively connected to connection terminals 12a-12j of fiber channel switches 10a and 10b via fiber channels (FC).

The fiber channel switches 10a and 10b make the host computers 11a and 11b recognize virtual storage units A and B, which have the same constitution. Namely, the host computers 11a and 11b are capable of accessing to the virtual storage units A and B similarly via any fiber channel switches 10a and 10b. In the following description, the structure having the multiplex fiber channel switches for producing redundant routes is called "multinode".

By employing the multinode structure, even if one of the fiber channel switches 10a and 10b breaks down, the computer system can be continuously operated. Therefore, failure resistance of the system can be improved.

In FIG. 4, each of the fiber channel switches 10a and 10b includes the virtual storage unit A, which is constituted by a part of a storage area a1 (an upper part in FIG. 4) of the physical storage unit X and a part of a storage area a2 (an upper part in FIG. 4) of the physical storage unit Y, and the virtual storage unit B, which is constituted by a part of a storage area b1 (a lower part in FIG. 4) of the physical storage unit Y and a part of a storage area b2 (a lower part in FIG. 4) of the physical storage unit X. The fiber channel switches 10a and 10b serve the virtual storage units A and B to the host computer 11a and 11b as accessible storage units.

The structures of the virtual units, which are produced by the fiber channel switches 10a and 10b, are not limited to the example shown in FIG. 4. A part or whole of storage areas of physical storage units may be optionally combined to produce virtual storage units.

In case of producing the virtual storage units in the multinode system, reserves of access rights (requests for occupying access rights) for accessing to the RAID storage unit (the physical storage units X and Y) must be adjusted between the fiber channel switches 10a and 10b.

While one of the fiber channel switches is accessing to the RAID storage unit (the physical storage units X and Y), if the other fiber channel switch accesses to the RAID storage unit (the physical storage units X and Y), data accessed by one fiber channel switch will be damaged. Especially, in case of virtualizing the storage, the fiber channel switch rarely accesses to a plurality of physical storage units in answer to the access of the host computer to one of the virtual storage units. Therefore, the reserves must be simultaneously performed for the physical storage units.

Conventionally, the fiber channel switches 10a and 10b mutually communicate, by Ethernet (trademark) communication means 13a and 13b, so as to adjust the reserves (see FIG. 4).

For example, the fiber channel switch 10b notifies the reserve of the RAID storage unit (the physical storage units X and Y) to the fiber channel switch 10a before reserving the RAID storage unit. The fiber channel switch 10b waits for a response to the notice, then sends a signal for executing the reserve to the RAID storage unit (the physical storage units X and Y). If the fiber channel switch 10a reserves the RAID storage unit (the physical storage units X and Y) when the fiber channel switch 10a receives the notice, the fiber channel switch 10a waits until terminating the access, then responds to the notice. If the fiber channel switch 10a does not reserve, the fiber channel switch 10a responds at once.

By performing the communication between the fiber channel switches 10a and 10b via the Ethernet to adjust the reserves of access to the RAID storage unit (the physical storage units X and Y), damaging data can be prevented.

Note that, as shown in FIG. 4, the Ethernet means 13a and 13b are multiplexed. Even if one of the Ethernet means 13a and 13b breaks down, the communication of the reserve can be performed via the other Ethernet means. Namely, failure resistance of the Ethernet communication can be improved.

However, in the conventional computer system having the multinode fiber channel switches, when all of the Ethernet means 13a and 13b break down, the communication of the reserve states cannot be performed. Even if a plurality of Ethernet communication routes are provided, their hardware structures are similar, so they rarely simultaneously reach the ends of their usefulness. In case of performing the Ethernet communication via an intermediary device, e.g., hub, all of the Ethernet communication routes will be out of service due to failure of the intermediary device or a power source. To improve reliability, a plurality of intermediary devices and power sources may be employed, but a production cost must be increased.

In the computer system having the conventional multinode fiber channel switches, when the Ethernet communication is interrupted, the reserves cannot be adjusted, so the fiber channel switches independently access to the physical storage units.

While one of the fiber channel switches is accessing to one of the physical storage units, if the other fiber channel switch accesses to the physical storage unit, data accessed by one fiber channel switch will be damaged.

SUMMARY OF THE INVENTION

The present invention was conceived to solve the above described problems.

An object of the present invention is to provide a fiber channel switch, which is capable of protecting data even if communication for adjusting reserves of access rights, which is performed by communication means, e.g., Ethernet, is interrupted.

Another object is to provide a computer system using the fiber channel switch.

To achieve the objects, the present invention has following structures.

(1) The fiber channel switch comprises: a plurality of connection terminals being respectively connected to a host computer and at least one physical storage unit via fiber channels; storage virtualization means for producing a virtual storage unit with a part or a whole of a storage area of the physical storage unit and making the host computer recognize the virtual storage unit; a first communication means for communicating with another fiber channel switch, which is multinodely arranged with respect to the fiber channel switch; access adjusting means for communicating with another fiber channel switch via the first communication means so as to adjust a reserve for accessing to the physical storage unit between the fiber channel switches; means for setting a master-slave relation between the fiber channel switches; block control means for blocking access between the host computer and the physical storage unit via the fiber channel switch if the fiber channel switch is set as a slave by the setting means when the communication between the fiber channel switches is interrupted.

When the communication between the fiber channel switches is interrupted, if the fiber channel switch is set as the slave, the access is blocked so the physical storage unit is not simultaneously reserved by the both of the fiber channel switches.

(2) In the fiber channel switch, the communication means may be an Ethernet (trademark).

With this structure, the communication can be performed by the popular Ethernet without using a special hardware.

(3) In the fiber channel switch, the master-slave relation between the fiber channel switches may be set by previously storing a datum, which indicates a master or slave state of the fiber channel switch with respect to another fiber channel switch, in a nonvolatile memory.

The master-slave relation between the fiber channel switches can be previously set by writing the data in the nonvolatile memory when constituting the system.

(4) The fiber channel switch may further comprise: a second communication means for communicating with another fiber channel switch via the connection terminals, which are further connected to another fiber channel switch via fiber channels; and master processing means for sending a command for blocking access between the host computer and the physical storage unit by the block control means to another fiber channel switch via the second communication means if the fiber channel switch is set as a master by the setting means when the communication between the fiber channel switches via the first communication means is interrupted.

Further, (5) the fiber channel switch may further comprise: a second communication means for communicating with another fiber channel switch via the connection terminals, which are further connected to another fiber channel switch via fiber channels; and slave processing means for blocking access between the host computer and the physical storage and notifying the block to another fiber channel switch via the second communication means if the fiber channel switch is set as a slave by the setting means when the communication between the fiber channel switches via the first communication means is interrupted.

With the structures (4) and (5), when the communication between the fiber channel switches via the first communication means is interrupted. The fiber channel switch can communicate with another fiber channel switch by the second communication means via at least one of the connection terminals, can instruct another fiber channel switch to perform the block according to the master-slave relation set by the setting means and can notify the block performed by the fiber channel switch. Namely, the communication is performed via the connection terminals for connecting the host computer and the physical storage unit. When one of the fiber channel switches detects the interruption of the first communication means, the access of the slave fiber channel switch can be rapidly and securely blocked without an extra special hardware. Therefore, the host computer can access to the physical storage unit via the master fiber channel switch only.

(6) The fiber channel switch may further comprise a second communication means for communicating with another fiber channel switch via the connection terminals, which are further connected to another fiber channel switch via fiber channels, wherein the setting means sets the master-slave relation between the fiber channel switches by communicating with another fiber channel switch via the second communication means when the communication with another fiber channel switch via the first channel switch is interrupted, and the block control means for blocking access between the host computer and the physical storage unit via the fiber channel switch if the fiber channel switch is set as a slave by the setting means when the communication between the fiber channel switches via the first communication means is interrupted.

With this structure, when the communication between the fiber channel switches is interrupted, the master-slave relation can be set by the communication via the second communication means.

The computer system comprises: a plurality of fiber channel switches according to one of the structures (1); a host computer being connected to the fiber channel switches via the connection terminals and the fiber channel; and at least one physical storage unit being connected to the fiber channel switches via the connection terminals and the fiber channel, wherein the fiber channel switches are multinodely arranged and capable of mutually communicating by the first communication means.

With this structure, when the communication between the multinode fiber channel switches is interrupted, the access by the slave fiber channel switch is blocked so that the physical storage unit is not simultaneously reserved by the both of the fiber channel switches.

Another computer system comprises: a plurality of fiber channel switches according to one of the structures (4)-(6); a host computer being connected to the fiber channel switches via the connection terminals and the fiber channel; and at least one physical storage unit being connected to the fiber channel switches via the connection terminals and the fiber channel, wherein the fiber channel switches are multinodely arranged and capable of mutually communicating by the first communication means.

With this structure, when the communication between the multinode fiber channel switches is interrupted, the fiber channel switches can communicate by the second communication means so as to allow the host computer to access to the physical storage unit via the master fiber channel switch only. Since the communication is performed via the connection terminals for connecting the host computer and the physical storage unit, the communication between the fiber channel switches can be performed, by the simple system, without an extra special hardware.

In the fiber channel switch of the present invention and the computer system using the fiber channel switch, when the communication for adjusting the reserves between the fiber channel switches, which is performed by communication means, e.g., Ethernet, is interrupted, the host computer is allowed to access to the physical storage unit via the master fiber channel switch only, so that the fiber channel switches never simultaneously reserve the physical storage unit. Therefore, damaging data of the physical storage unit can be prevented.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
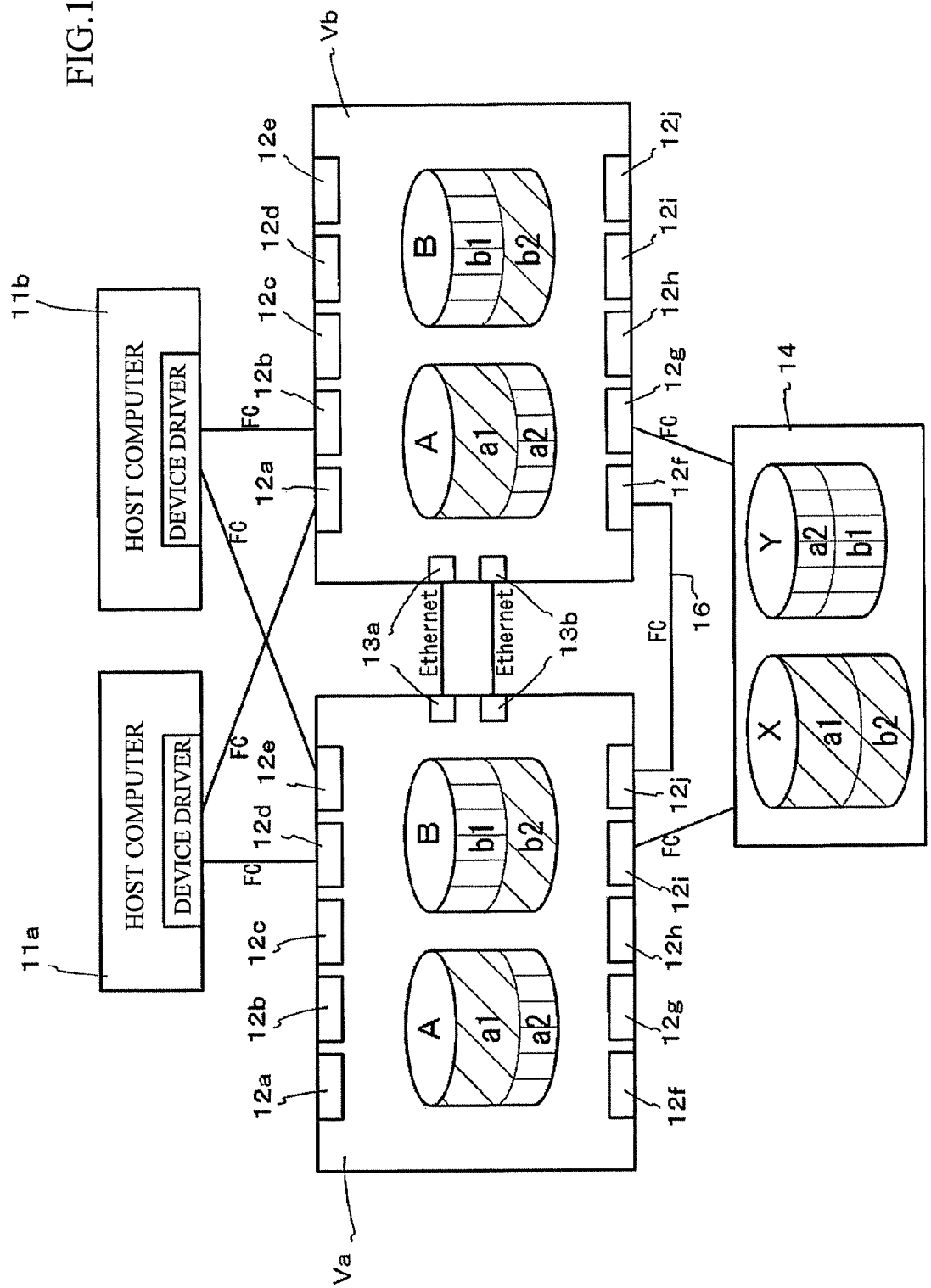
FIG. 1 is a block diagram of an embodiment of a computer system of the present invention.
Figure 4:
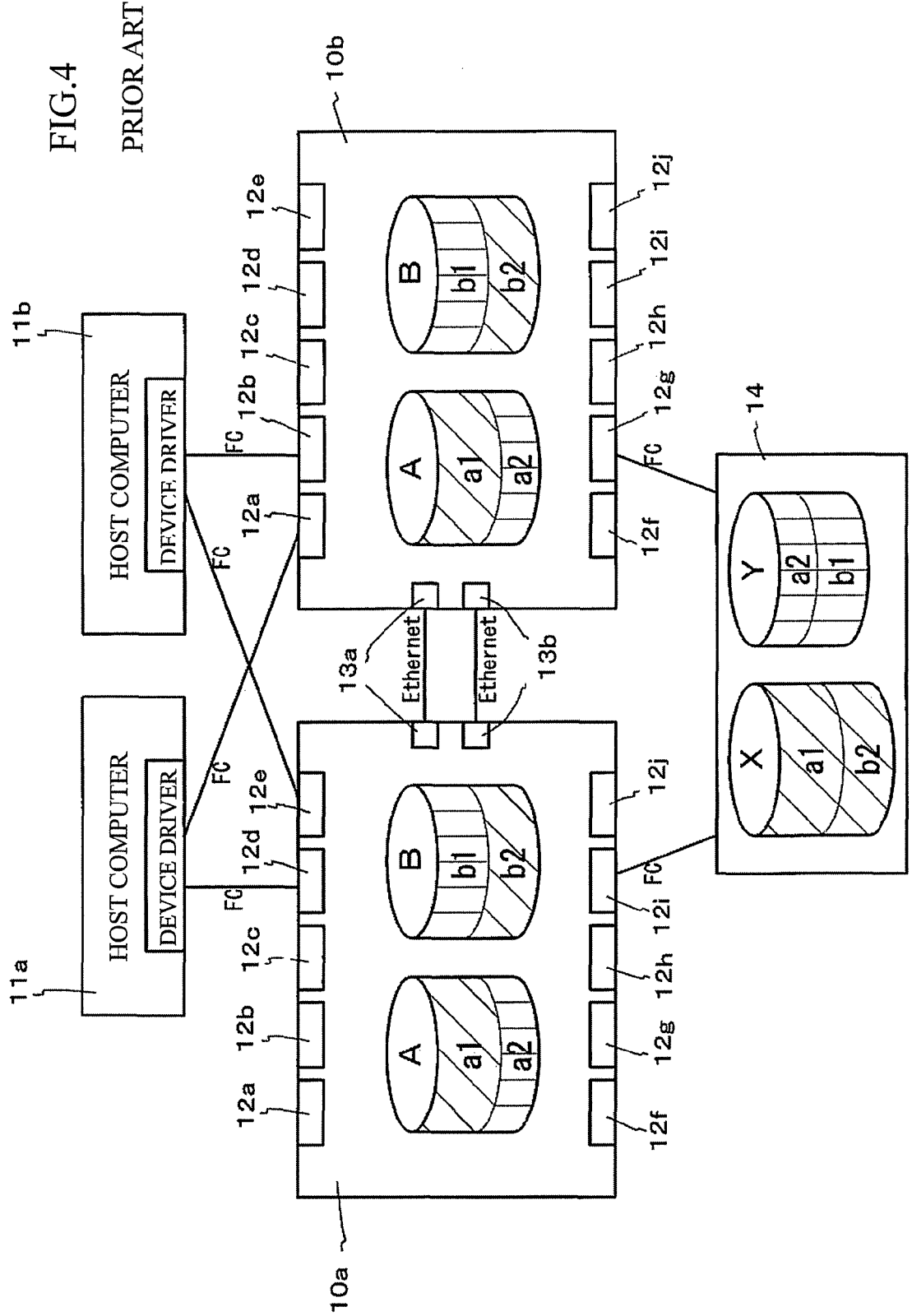
FIG. 4 is a block diagram of another conventional computer system using a plurality of the (multinode) fiber channel switches.

A computer system of an embodiment of the present invention is shown in FIG. 1. A basic structure of the computer system of the present embodiment is similar to that of the described conventional computer system shown in FIG. 4, so the structural elements shown in FIG. 4 are assigned the same symbols and explanation will be omitted. In the present embodiment, fiber channel switches Va and Vb are used instead of the fiber channel switch 10 shown in FIG. 4, and the multinode fiber channel switches Va and Vb are capable of communicating via not only Ethernet means 13a and 13b but also a fiber channel 16.

The fiber channel switches Va and Vb, which are a main part of the computer system of the present embodiment, will be explained.

The fiber channel switches Va and Vb have connection terminals 12a-12j. The host computer 11a and 11b and the RAID storage unit 14, which is constituted by the physical storage units X and Y, can be connected to the fiber channel switches Va and Vb via fiber channels FC and the connection terminals 12a-12j. The fiber channels, e.g., coaxial cables, optical fiber cables, can be connected to the connection terminals 12a-12j. Therefore, the host computer 11a and 11b and the RAID storage unit 14 can be connected to the connection terminals 12a-12j via the fiber channel cables (see FIG. 1).

Figure 2:
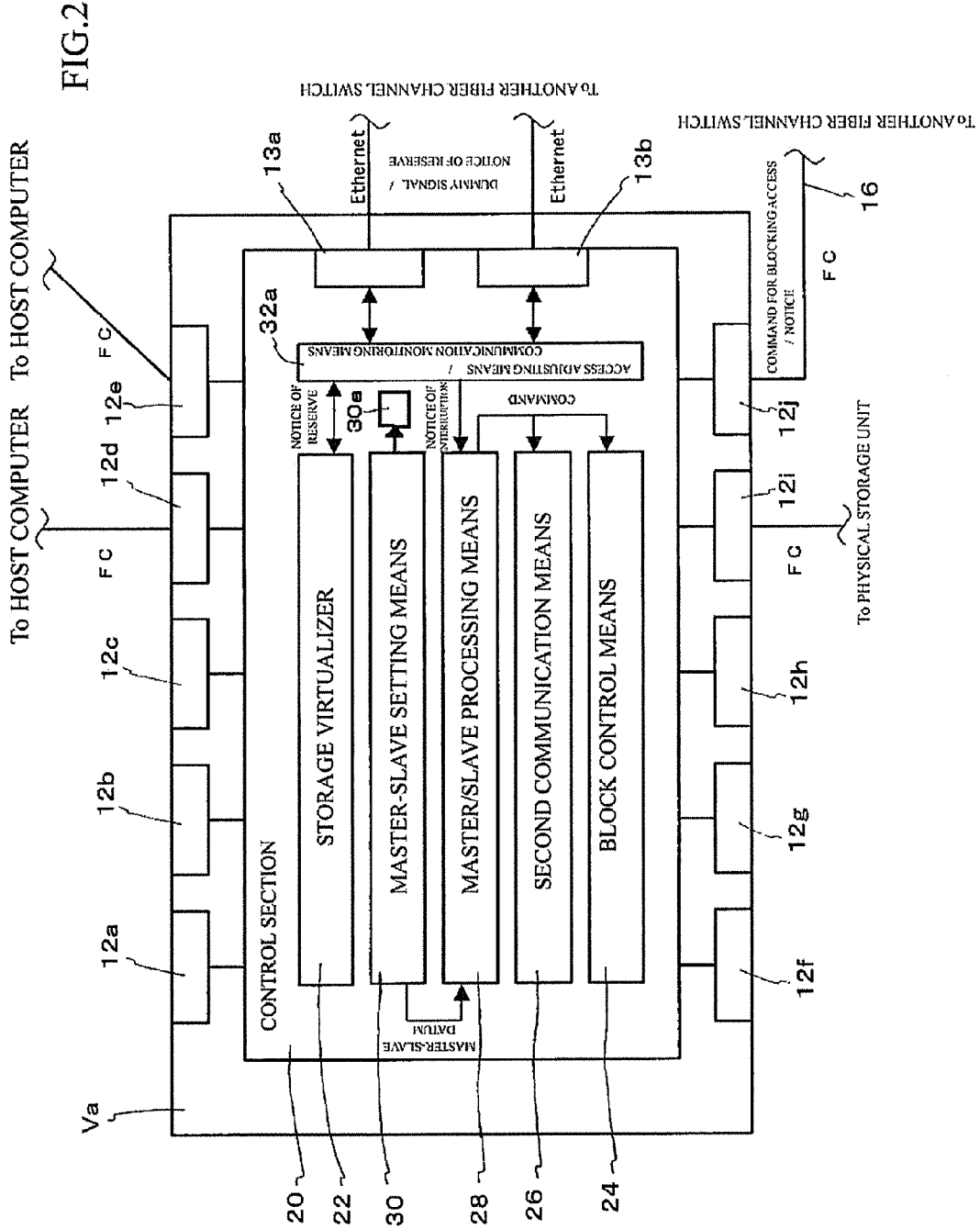
FIG. 2 is a block diagram of a fiber channel switch used in the computer system.
Figure 3:
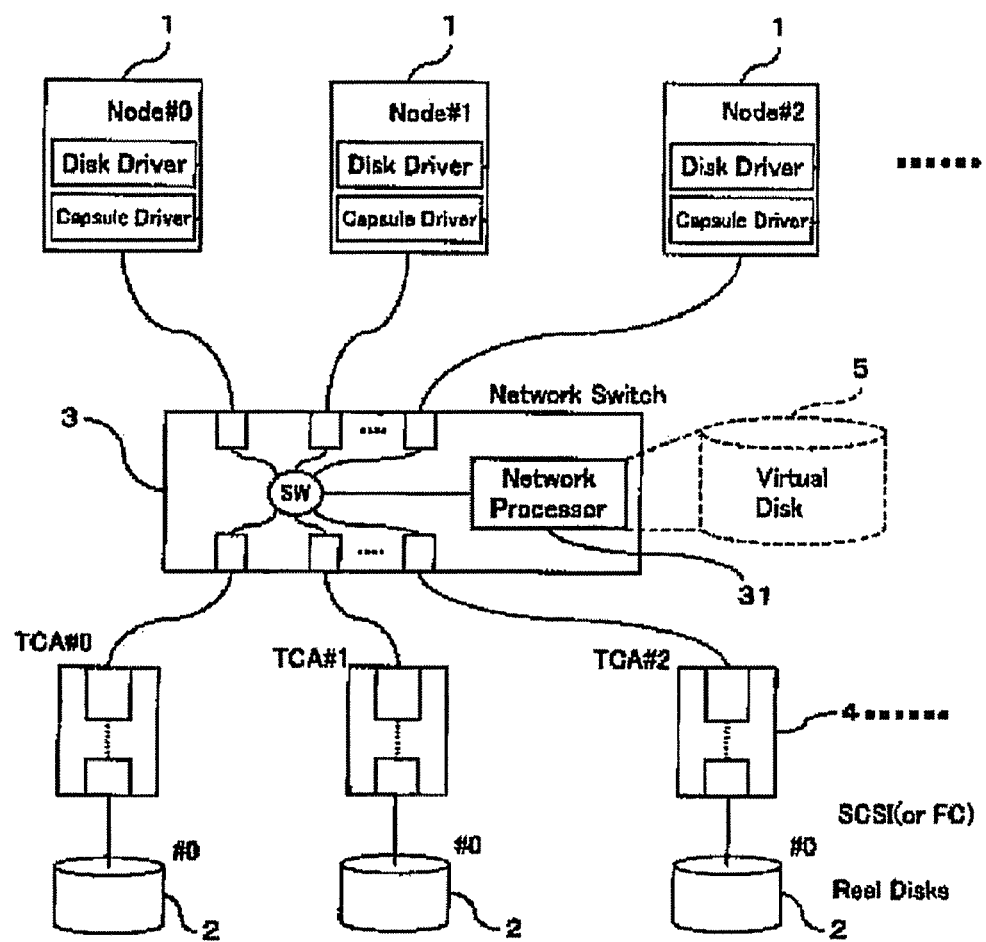
FIG. 3 is a block diagram of the conventional computer system using the conventional fiber channel switch.

FIG. 2 is a block diagram of the fiber channel switch Va. Note that, the fiber channel switches Va and Vb have the same structure, so that of the fiber channel switches Vb is omitted.

The fiber channel switch Va has a control section 20 including a CPU, LSIs, memories, etc. The control section 20 executes firmware programs stored in a ROM and functions of the LSIs so as to act as virtualization means 22, block control means 24, second communication means 26, master/slave processing means 28, master-slave setting means 30, access adjusting means 32a, communication monitoring means 32b and Ethernet means (a first communication means) 13a and 13b.

Virtualization Means

The virtualization means 22 is connected to the physical storage units X and Y via the connection terminals 12a-12j (the connection terminals 12i and 12j are used in FIG. 1). The virtualization means 22 produces the virtual storage units A and B by combining parts or the whole of storage areas of the physical storage units X and Y and serves to the host computers 11a and 11b. The host computers 11a and 11b recognize the virtual storage units A and B. The constitutions of the virtual storage units A and B are not limited to the present example, so parts or the whole of storage areas of the physical storage units may be optionally combined to produce the virtual storage units.

The virtualization means 22 accesses to corresponding storage areas of the physical storage units X and Y via the connection terminals 12i and 12j on the basis of an access signal, which is inputted from the host computers 11a and 11b via the connection terminals, e.g., 12d and 12e.

Access Adjusting Means

The access adjusting means 32a communicates with another fiber channel switch Vb via the Ethernet means 13a and 13b so as to adjust reserves of access rights for accessing to the physical storage units X and Y (the RAID storage unit 14) between the multinode fiber channel switches Va and Vb.

For example, the virtualization means 22 notifies the reserve of the physical storage units X and Y to the access adjusting means 32a before reserving the access right for accessing to the physical storage units X and Y. The access adjusting means 32a sends the notice to the fiber channel switch Vb via the Ethernet means 13a and 13b and waits for a response. Upon receiving the response, the access adjusting means 32a sends an allowance signal for allowing to reserve the access rights for accessing to the physical storage units X and Y to the virtualization means 22. Upon receiving the allowance signal, the virtualization means 22 reserves the physical storage units X and Y.

On the other hand, when the access adjusting means 32a receives the notice for reserving the physical storage units X and Y from the fiber channel switch Vb via the Ethernet means 13a and 13b, if the physical storage units X and Y are not reserved, the access adjusting means 32a responds to the notice at once; if the physical storage units X and Y are reserved, the access adjusting means 32a waits until terminating the access, then responds to the notice.

Since the fiber channel switches Va and Vb mutually communicate via the Ethernet means, etc. so as to adjust the reserves of the RAID storage unit 14 (the physical storage units X and Y), damaging data stored in the RAID storage unit 14 can be prevented.

Communication Monitoring Means

The communication monitoring means 32b always monitors occurrence of communication failure between the fiber channel switches Va and Vb via the Ethernet means 13a and 13b.

Further, the communication monitoring means 32b checks if the access adjusting means 32a sends the notice for adjusting the reserve to the fiber channel switch Vb or not.

When the access to the virtual storage unit by the host computers 11a and 11b is stopped or when the required communication (e.g., communication for adjusting the reserve) with the fiber channel switch Vb is stopped, the communication monitoring means 32b sends a dummy signal to the fiber channel switch Vb and monitors the response, so that the communication monitoring means 32b can always monitor occurrence of communication failure. For example, when the communication between the fiber channel switches Va and Vb is stopped for one second or more, the communication monitoring means 32b sends the dummy signals every one second.

When the communications for adjusting the reserves and the response to the dummy signals via the Ethernet means 13a and 13b are stopped for a prescribed time, the communication monitoring means 32b sends a notice of occurring communication interruption via the Ethernet 13a and 13b to the master/slave processing means 28.

Block Control Means

The block control means 24 is capable of blocking the access of the host computers 11a and 11b to the physical storage units X and Y via the fiber channel switch Va.

For example, the block control means 24 sends a busy signal, which indicates an access busy state of the virtual storage units A and B, to the host computers 11a and 11b via the connection terminals 12d and 12e, to which the host computers 11a and 11b are connected, so as to prohibit the host computers 11a and 11b to access to the virtual storage units A and B. With this action, the host computers 11a and 11b cannot access to the virtual storage units A and B, so they will access to the virtual storage units A and B via other unbusy paths, which are connected to the other fiber channel switch Vb.

Second Communication Means

The second communication means 26 is capable of communicating with the other fiber channel switch Vb via the connection terminals and the fiber channels connected thereto.

Master-Slave Setting Means

The master-slave setting means 30 sets the master-slave relation between the fiber channel switches Va and Vb. The master-slave relation between the fiber channel switches Va and Vb is set by previously storing a datum, which indicates a master or slave state of the fiber channel switch Va with respect to the other fiber channel switch Vb, in a nonvolatile memory 30a.

With this structure, the master-slave relations between the fiber channel switches Va and Vb can be defined by writing the data in the nonvolatile memory 30a when constituting the computer system.

Master/Slave Processing Means

The master/slave processing means 28 acts as master processing means and slave processing means. When the communication with the fiber channel switch Vb via the Ethernet means 13a and 13b is stopped, if the fiber channel switch Va is set as the master by the master-slave setting means 30, the master/slave processing means 28 sends a command for blocking the access between the host computers 11a and 11b and the physical storage units X and Y by the block control means 24 of the fiber channel switch Vb to the fiber channel switch Vb via the second communication means 26. This function is performed as the master processing means.

When the fiber channel switch Vb receives the command sent via the second communication means 26, the fiber channel switch Vb makes the block control means 24 block the access from the host computers 11a and 11b to the physical storage units X and Y.

Note that, the fiber channel switch Va, which has been set as the master by the master-slave setting means 30, allows the access without blocking the access from the host computers 11a and 11b to the physical storage units X and Y.

When the communication with the fiber channel switch Vb via the Ethernet means 13a and 13b is stopped, if the fiber channel switch Va is set as the slave by the master-slave setting means 30, the master/slave processing means 28 blocks the access between the host computers 11a and 11b and the physical storage units X and Y by the block control means 24 and notifying the block to the fiber channel switch Vb via the second communication means 26. This function is performed as the slave processing means.

In the computer system using the fiber channel switches Va and Vb of the present embodiment, when the communication between the fiber channel switches Va and Vb via both of the Ethernet means 13a and 13b is interrupted, the fiber channel switch, which has been set as the slave by the master-slave setting means 30, blocks the access from the host computers 11a and 11b to the physical storage units X and Y. Therefore, the host computers 11a and 11b access via only the fiber channel switch, which has been set as the master by the master-slave setting means 30 and which does not block the access. Unlike the conventional computer system, one physical storage unit is not simultaneously reserved by a plurality of the fiber channel switches, so that damaging data stored in the physical storage unit can be prevented.

Note that, in the present embodiment, the master/slave processing means 28 of the fiber channel switches Va and Vb have the functions of the master processing means and the slave processing means. Therefore, the block of the access can be rapidly performed on the basis of the command or the notice sent, from the fiber channel switch, which first detects the communication interruption of the Ethernet means 13a and 13b.

Note that, the present invention is not limited to the above described embodiment. For example, one of the master processing means and the slave processing means may be used instead of the master/slave processing means 28.

When the communication via the Ethernet means 13a and 13b (the first communication means) is interrupted, the communication via the second communication means is rarely interrupted. For example, when one of the fiber channel switches breaks down, the phenomenon occurs. In this case, the fiber channel switch, which has been set as the slave by the master-slave setting means 30, blocks the access. Further, in case that the communication via the second communication means 26 is interrupted, the access may be blocked without reference to the master-slave relation set by the master-slave setting means 30.

The master processing means and the slave processing means, which send the command and the notice via the second communication means 26, may be omitted. When the communication monitoring means 32b detects the communication interruption of the Ethernet means 13a and 13b, the slave fiber channel switch may block the access without communication with the other fiber channel switch.

In the above described embodiment, the master-slave setting means 30 previously write the datum indicating the master-slave relation in the nonvolatile memory 30a, but the present invention is not limited to the embodiment. The master-slave setting means 30 may determine the master or slave state of one of the fiber channel switches by communicating with the other fiber channel switch via the second communication means 26 when the communication with the other fiber channel switch via the Ethernet means 13a and 13b is interrupted.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fiber channel switch multinodely arranged with respect to other fiber channel switch and having a plurality of connection terminals being respectively connected to a host computer and connected to at least one physical storage unit via fiber channels and having storage virtualization means for producing a virtual storage unit with a part or a whole of a storage area of the physical storage unit and making the host computer recognize the virtual storage unit, the fiber channel switch comprising:
   two first communication means for communicating with the other fiber channel switch;
   access adjusting means for communicating a reserve notification of the physical storage unit with the other fiber channel switch via said first communication means and adjusting a reserve state of the physical storage unit with the other fiber channel switch;
   means for setting a master-slave relation with the other fiber channel switch;
   a second communication means for communicating with the other fiber channel switch via said connection terminals, which are further connected to the other fiber channel switch via fiber channels; and
   means for master and/or slave processing by sending a command for blocking access between the host computer and the physical storage unit by said block control means to the other fiber channel switch via said second communication means if said fiber channel switch is set as a master by said setting means, when the communication with the other fiber channel switch via said first communication means is interrupted, or by blocking access between the host computer and the physical storage and notifying the block to the other fiber channel switch via said second communication means if said fiber channel switch is set as a slave by said setting means, when the communication with the other fiber channel switch via said first communication means is interrupted.

2. The fiber channel switch according to claim 1, wherein the master-slave relation with the other fiber channel switch is set by previously storing a datum, which indicates a master or slave state of said fiber channel switch with respect to the other fiber channel switch, in a nonvolatile memory.

3. The fiber channel switch according to claim 1,
   wherein said setting means sets the master-slave relation with the other fiber channel switch by communicating with the other fiber channel switch via said second communication means when the communication with the other fiber channel switch via said two first communication means is interrupted.

4. A computer system, comprising:
   host computers;
   at least one physical storage unit; and
   a plurality of fiber channel switches multinodely arranged with respect to other fiber channel switch and each having a plurality of connection terminals being respectively connected to a host computer and connected to at least one physical storage unit via fiber channels and having a storage virtualization that produces a virtual storage unit with a part or a whole of a storage area of the physical storage unit and making the host computer recognize the virtual storage unit, each fiber channel switch further including:
   two first data communicators that communicate with the other fiber channel switch,
   a second data communicator that communicates with the other fiber channel switch via said connection terminals, which are further connected to the other fiber channel switch via fiber channels, and
   a computer processor that executes:
      adjusting a reserve state of the physical storage unit with the other fiber channel switch by communicating through a first two data communicator a reserve notification of the physical storage to the other fiber channel switch,
      setting a master-slave relation with the other fiber channel switch,
      controlling blocking of access between the host computer and the physical storage unit, according to the setting of the master-slave relations when the communication with the other fiber channel switch via two first data communicators is interrupted, and
      master processing by sending a command for blocking access between the host computer and the physical storage unit to the other fiber channel switch via said second data communicator if said fiber channel switch is set as a master by said setting, when the communication with the other fiber channel switch via said two first data communicators is interrupted, or slave processing by blocking access between the host computer and the physical storage and notifying the block to the other fiber channel switch via said second data communicator if said fiber channel switch is set as a slave by said setting, when the communication with the other fiber channel switch via said two first data communicators is interrupted.

5. A computer system, comprising:
   host computers;
   at least one physical storage unit; and
   a plurality of fiber channel switches multinodely arranged with respect to other fiber channel switch and each having a plurality of connection terminals being respectively connected to a host computer and connected to at least one physical storage unit via fiber channels and having storage virtualization means for producing a virtual storage unit with a part or a whole of a storage area of the physical storage unit and making the host computer recognize the virtual storage unit, each fiber channel switch further including:

two first communication means for communicating with the other fiber channel switch, access adjusting means for communicating a reserve notification of the physical storage unit with the other fiber channel switch via said first communication means and adjusting a reserve state of the physical storage unit with the other fiber channel switch, means for setting a master-slave relation with the other fiber channel switch, and block control means for blocking access between the host computer and the physical storage unit, if the fiber channel switch is set as a slave by said setting means when the communication with the other fiber channel switch via said two first communication means is interrupted, second communication means for communicating with the other fiber channel switch via said connection terminals, which are further connected to the other fiber channel switch via fiber channels, and master processing means for sending a command for blocking access between the host computer and the physical storage unit by said block control means to the other fiber channel switch via said second communication means if said fiber channel switch is set as a master by said setting means, when the communication with the other fiber channel switch via said two first communication means is interrupted.

6. A computer system, comprising:

host computers;

at least one physical storage unit; and a plurality of fiber channel switches multinodely arranged with respect to other fiber channel switch and each having a plurality of connection terminals being respectively connected to a host computer and connected to at least one physical storage unit via fiber channels and having storage virtualization means for producing a virtual storage unit with a part or a whole of a storage area of the physical storage unit and making the host computer recognize the virtual storage unit, each fiber channel switch further including:

two first communication means for communicating with the other fiber channel switch, access adjusting means for communicating a reserve notification of the physical storage unit with the other fiber channel switch via said first communication means and adjusting a reserve state of the physical storage unit with the other fiber channel switch, means for setting a master-slave relation with the other fiber channel switch, and block control means for blocking access between the host computer and the physical storage unit, if the fiber channel switch is set as a slave by said setting means when the communication with the other fiber channel switch via said two first communication means is interrupted, a second communication means for communicating with the other fiber channel switch via said connection terminals, which are further connected to the other fiber channel switch via fiber channels; and slave processing means for blocking access between the host computer and the physical storage and notifying the block to the other fiber channel switch via said second communication means if said fiber channel switch is set as a slave by said setting means, when the communication with the other fiber channel switch via said two first communication means is interrupted.

7. A computer system, comprising:

host computers; and at least one physical storage unit; and a plurality of fiber channel switches multinodely arranged with respect to other fiber channel switch and each having a plurality of connection terminals being respectively connected to a host computer and connected to at least one physical storage unit via fiber channels and having storage virtualization means for producing a virtual storage unit with a part or a whole of a storage area of the physical storage unit and making the host computer recognize the virtual storage unit, each fiber channel switch further including:

two first communication means for communicating with the other fiber channel switch, access adjusting means for communicating a reserve notification of the physical storage unit with the other fiber channel switch via said first communication means and adjusting a reserve state of the physical storage unit with the other fiber channel switch, means for setting a master-slave relation with the other fiber channel switch, and a second communication means for communicating with the other fiber channel switch via said connection terminals, which are further connected to the other fiber channel switch via fiber channels, wherein said setting means sets the master-slave relation with the other fiber channel switch by communicating with the other fiber channel switch via said second communication means when the communication with the other fiber channel switch via said two first communication means is interrupted, and said block control means blocks access between the host computer and the physical storage unit via said fiber channel switch, if said fiber channel switch is set as a slave by said setting means when the communication with the other fiber channel switch via said two first communication means is interrupted.

8. A fiber channel switch multinodely arranged with respect to other fiber channel switch and having a plurality of connection terminals being respectively connected to a host computer and connected to a physical data storage via fiber channels and having a storage virtualization that produces a virtual data storage with a part or a whole of a storage area of the physical data storage and making the host computer recognize the virtual data storage, the fiber channel switch comprising:

two first data communicators that communicate with the other fiber channel switch;

a second data communicator that communicates with the other fiber channel switch via said connection terminals, which are further connected to the other fiber channel switch via fiber channels;

a computer processor that executes:

adjusting a reserve state of the physical storage with the other fiber channel switch by communicating through a first data communicator a reserve notification of the physical storage to the other fiber channel switch, setting of a master-slave relation with the other fiber channel switch, and controlling blocking of access between the host computer and the physical storage unit, according to the setting of the master-slave relation when the communication with the other fiber channel switch through the two first data communicators is interrupted, master processing by sending a command for blocking access between the host computer and the physical storage unit to the other fiber channel switch via said second data communicator if said fiber channel switch is set as a master by said setting, when the communication with the other fiber channel switch via said two first data communicators is interrupted, or slave processing by blocking access between the host computer and the physical storage and notifying the block to the other fiber channel switch via said second data communicator if said fiber channel switch is set as a slave by said setting, when the communication with the other fiber channel switch via said two first data communicators is interrupted.

9. The fiber channel switch according to claim 8, wherein the computer processor further executes:

sending a dummy signal to the other fiber channel switch via said two first data communicator and monitoring response therefrom so as to monitor occurrence of communication failure with the other fiber channel switch via said two first data communicators.

* * * * *